United States Patent
Miyauchi

(10) Patent No.: US 6,272,052 B1
(45) Date of Patent: Aug. 7, 2001

(54) BLOCK-ERASE TYPE SEMICONDUCTOR STORAGE DEVICE WITH INDEPENDENT MEMORY GROUPS HAVING SEQUENTIAL LOGICAL ADDRESSES

(75) Inventor: Shigenori Miyauchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/237,862

(22) Filed: Jan. 27, 1999

(30) Foreign Application Priority Data

Aug. 21, 1998 (JP) .................................. 10-235414

(51) Int. Cl.[7] ................................................ G06F 12/00
(52) U.S. Cl. ................................ 365/185.33; 365/185.29; 365/218; 711/209; 711/103; 711/218; 711/170
(58) Field of Search ................................ 711/103, 5, 165, 711/170, 202, 203, 209, 218, 221, 206; 365/185.29, 185.33, 218

(56) References Cited

U.S. PATENT DOCUMENTS

| | | | |
|---|---|---|---|
| 5,357,475 | * 10/1994 | Hasbun et al. ...................... | 711/103 |
| 5,457,658 | * 10/1995 | Niijima et al. ....................... | 365/218 |
| 5,809,515 | * 9/1998 | Kaki et al. ............................ | 711/103 |
| 5,946,714 | * 8/1999 | Miyauchi ............................. | 711/205 |
| 6,014,755 | * 1/2000 | Wells et al. .............................. | 714/8 |
| 6,069,827 | * 5/2000 | Sinclair .......................... | 365/185.29 |
| 6,125,424 | * 9/2000 | Komatsu et al. .................... | 711/103 |
| 6,130,837 | * 10/2000 | Yamagami et al. ............. | 365/189.09 |

FOREIGN PATENT DOCUMENTS 6-259320   9/1994 (JP) .

* cited by examiner

Primary Examiner—Hiep T. Nguyen
Assistant Examiner—Hong Kim
(74) Attorney, Agent, or Firm—McDermott, Will & Emery

(57) ABSTRACT

A semiconductor storage device having a plurality of block-erase type non volatile memory chips classifies the memory chips into memory groups of a number equal to twice the number of buffer memories provided in the storage device and assigns logic sector addresses sequentially to sectors contained in one erase block of each memory group in such a manner that the logic sector addresses are sequenced in series to those in the corresponding erase block of the next succeeding memory group.

4 Claims, 3 Drawing Sheets

| | | | | Physical sector address |
|---|---|---|---|---|
| | · | · | · | · | 2(xxxx)h |
| Chip C4 (1st memory) | · | · | · | · | · |
| | · | · | · | · | xxxxh+2h |
| | · | · | · | · | xxxxh+1h |
| | · | · | · | · | xxxxh |
| Chip C3 (2nd memory) | · | · | · | · | · |
| | 000001Ch | 000001Dh | 000001Eh | 000001Fh | 0001h |
| | 000000Ch | 000000Dh | 000000Eh | 000000Fh | 0000h |
| | · | · | · | · | xxxxh |
| Chip C2 (3rd memory) | · | · | · | · | · |
| | 0000018h | 0000019h | 000001Ah | 000001Bh | 0001h |
| | 0000008h | 0000009h | 000000Ah | 000000Bh | 0000h |
| | · | · | · | · | xxxxh |
| Chip C1 (2nd memory) | · | · | · | · | · |
| | 0000014h | 0000015h | 0000016h | 0000017h | 0001h |
| | 0000004h | 0000005h | 0000006h | 0000007h | 0000h |
| | · | · | · | · | xxxxh |
| Chip C0 (1st memory) | · | · | · | · | · |
| | 0000010h | 0000011h | 0000012h | 0000013h | 0001h |
| | 0000000h | 0000001h | 0000002h | 0000003h | 0000h |

Fig.5

| Data write process to 1st memory | Data write process to 2nd memory | Data write process to 3rd memory | Data write process to 4th memory |
|---|---|---|---|
| Host→ 1st buffer | No Activity | No Activity | No Activity |
| Data erase | Host→ 2nd buffer | | |
| | Data erase | | |
| 1st buffer→ 1st memory | | Host→ 1st buffer | |
| Data write | 2nd buffer→ 2nd memory | | |
| | Data write | Data erase | Host→ 2nd buffer |
| No Activity | | 1st buffer→ 3rd memory | Data erase |
| | No Activity | Data write | 2nd buffer→ 4th memory |
| | | No Activity | Data write |

(time)

BLOCK-ERASE TYPE SEMICONDUCTOR STORAGE DEVICE WITH INDEPENDENT MEMORY GROUPS HAVING SEQUENTIAL LOGICAL ADDRESSES

BACKGROUND OF THE INVENTION

1. Field of the Invention

The present invention relates to a semiconductor storage device using nonvolatile memory as a storage medium and, more particularly, to a semiconductor storage device using nonvolatile memory such as block-erase type flash memory.

2. Description of the Prior Art

In a semiconductor storage device using block-erase type nonvolatile memory, for example, flash memory, the flash memory can write or read data only in steps of 8 bits or 16 bits. In contrast to this, a host system unit comprising information processing equipment or the like that makes access to the semiconductor storage device performs data transfer in steps of, for example, 512 B. Therefore, the semiconductor storage device is equipped with one sector buffer as buffer memory for temporarily storing data.

However, while the flash memory is performing data write or data erase, data within the sector buffer cannot be erased so that the host system unit has to stop the next data transfer operation, being on standby. This would involve longer time for data erase and write operations, as a problem.

Thus, there has been disclosed, in Japanese Patent Laid-Open Publication No. 6-259320, a nonvolatile memory device in which a plurality of buffer memories of the same size as the sector size, which is the reprogramming unit of the nonvolatile memory, are provided and associated with the same number of nonvolatile memory blocks in one-to-one correspondence, thus allowing data write and read operations to be performed. This known nonvolatile memory device has a constitution that, during data write operation, the activities of individual sectors of the memory blocks are selected and controlled while being shifted on time base, in the unit of at least one sector within the memory blocks. Using this constitution allows data transfer to be achieved more efficiently and more effectively, as compared with those in which only one sector buffer is provided.

However, in this known nonvolatile memory device, in which a plurality of memory blocks and the buffer memories are associated with each other in one-to-one correspondence, when the memory blocks each having a 2 KB sector size are provided in 8 lines, as an example, the buffer memory in the nonvolatile memory device needs to be sized 16 KB. This would involve increased cost as a problem.

Also, the data transfer time from buffer memory to nonvolatile memory in the data write process to the nonvolatile memory is much shorter than the time of data write operation, i.e., the time of charge injection to or discharge from the floating gates of memory cells. That is, after the data transfer from a buffer memory to its corresponding memory block, although the buffer memory is ready to accept the next data, the buffer memory corresponding to the memory block will not be usable until a command for data write to the corresponding memory block is issued from the host system unit, because of the one-to-one correspondence between buffer memories and memory blocks. This would involve another problem of worsened efficiency of use of the buffer memories.

SUMMARY OF THE INVENTION

The present invention has been accomplished to solve these and other problems, and an object of the invention is to provide a semiconductor storage device which can perform data write to a block-erase type nonvolatile memory with low cost, high efficiency and high speed.

To achieve this object, according to the present invention, there is provided a semiconductor storage device which is to be used in connection with the host system unit comprising information processing equipment or the like and which is implemented by block-erase type non-volatile memory, the semiconductor storage device comprising: a memory section comprising a plurality of integrated circuit (IC) memories of block-erase type nonvolatile memory each IC memory comprised of a plurality of erase blocks each having a plurality of sectors; a buffer memory section comprising a plurality of buffer memories for temporarily storing therein data which is transferred from the host system unit and to be stored in the memory section; and a control section for performing operation control of the memory section and the buffer memory section according to a command from the host system unit, wherein the control section controls the memory section by grouping said plurality of IC memories into a plurality of memory groups and assigning respective sequences of logic sector addresses to each memory group such that the logic sector addresses in one erase block of each memory group are sequenced in series to the logic sector addresses in the corresponding erase block of the next succeeding memory group.

With this constitution, data processing can be performed independently for each memory group, so that high-speed data write and data read can be accomplished.

Further, desirably, the number of memory groups to be grouped into is equal to twice the number of the buffer memories provided in the buffer memory section.

In either case, it is desirable that the memory section stores conversion tables each in a specified memory space within each memory group, the conversion tables being provided for the individual memory groups, respectively, to convert logical sector addresses into a physical sector address, in correspondence between memory groups and conversion tables. In this case, data processing can be performed independently for each memory group, so that high-speed data write and read can be achieved.

Preferably, each buffer memory in the buffer memory section has enough storage capacity to store at least data of unit erase blocks in the memory section. With such a constitution, high-speed data write and read can be performed, and particularly in burst data transfer, data write and read can be achieved with high efficiency.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 5 is a schematic time sequence showing the flow of write data in the semiconductor storage device 1 during the data write process.

DETAILED DESCRIPTION OF THE EMBODIMENT

Figure 1:
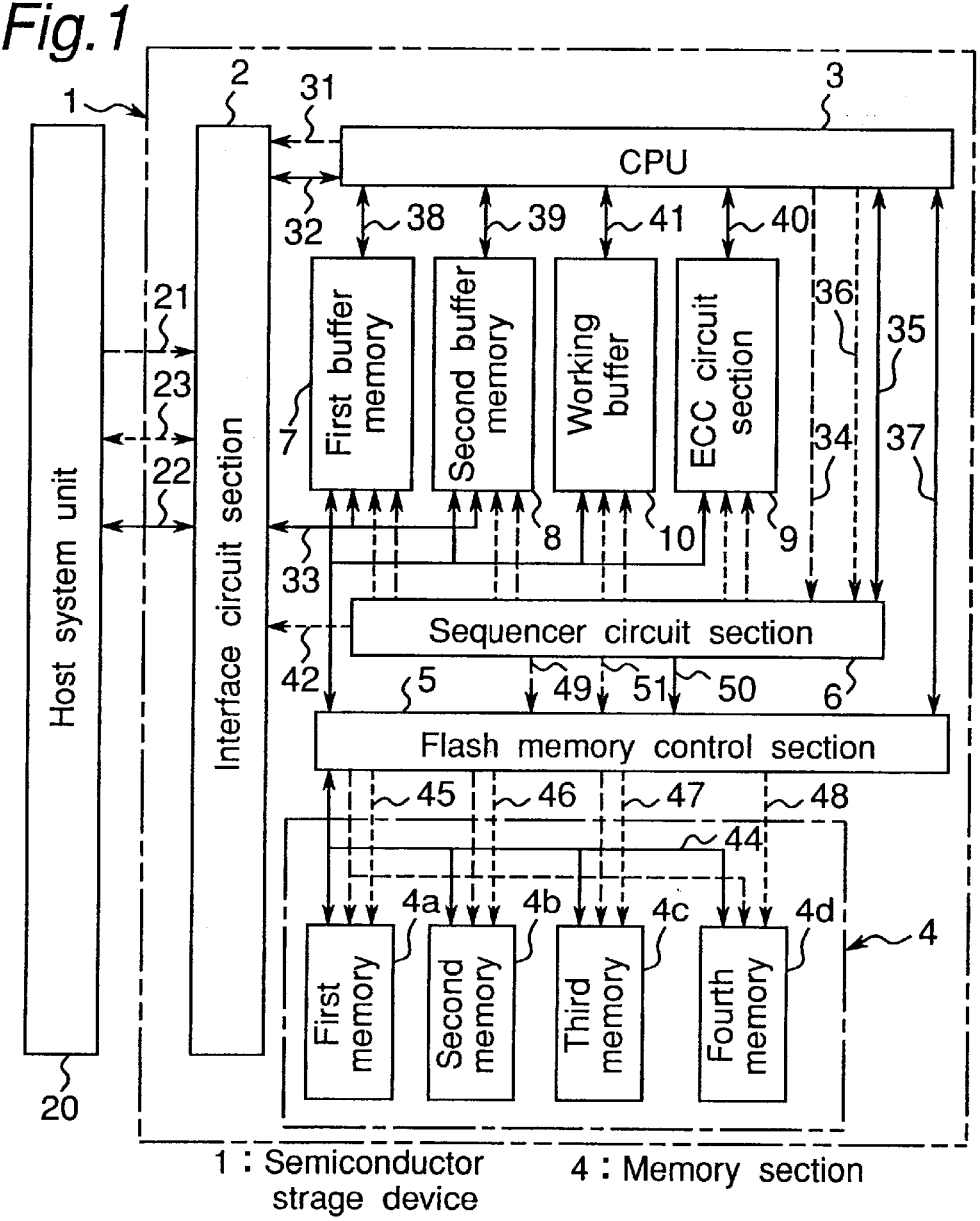
FIG. 1 is a schematic block diagram showing a semiconductor storage device according to an embodiment of the present invention.

Hereinbelow, the present invention is described in detail based on an embodiment thereof as illustrated in the accompanying drawings. FIG. 1 is a schematic block diagram showing an example of the semiconductor storage device according to an embodiment of the present invention. This embodiment is explained on a case where a nonvolatile memory with a 2 Kbyte erase block unit is used. Besides, in FIG. 1, solid line represents data bus, broken line represents address bus and dotted line represents control signal line.

Referring to FIG. 1, the semiconductor storage device 1 comprises: an interface circuit section 2 for interfacing with an external host system unit 20 implemented by information processing equipment or the like; a CPU 3 for performing the control of individual circuit sections according to a command from the host system unit 20; a memory section 4 comprising a plurality of IC memories implemented by block-erase type flash memory; a flash memory control section 5 for performing the operation control of the memory section 4; and a sequencer circuit section 6 for performing the operation control of the flash memory control section 5. In the memory section 4, the IC memories are divided into specified groups, for example, four groups of a first memory 4a, a second memory 4b, a third memory 4c and a fourth memory 4d by the CPU 3.

The semiconductor storage device 1 further comprises: a first buffer memory 7 and a second buffer memory 8 constituting the buffer memory that temporarily stores data from the host system unit 20; an ECC circuit section 9 for generating an error correcting code (hereinafter, referred to as ECC) and performing the correction of a data error by using the generated ECC; and a working buffer 10 which is used by the CPU 3.

The interface circuit section 2 is connected to the host system unit 20 via an address bus 21, a data bus 22, and a control signal line 23 comprising a plurality of signal lines. The interface circuit section 2 is further connected to the CPU 3 via an internal address bus 31 and an internal data bus 32, and to the first buffer memory 7 and the second buffer memory 8 via an internal data bus 33.

The CPU 3 is connected to the sequencer circuit section 6 via an internal address bus 34, an internal data bus 35, and an internal control signal line 36 comprising a plurality of signal lines, and further to the flash memory control section 5 via an internal data bus 37. Also, the CPU 3 is connected to the first buffer memory 7 via an internal data bus 38, to the second buffer memory 8 via an internal data bus 39, to the ECC circuit section 9 via an internal data bus 40, and to the working buffer 10 via an internal data bus 41.

The flash memory control section 5 is connected to the first buffer memory 7, the second buffer memory 8, the ECC circuit section 9 and the working buffer 10 via an internal data bus 42. Also, the flash memory control section 5 is connected to the first memory 4a to the fourth memory 4d via an internal address bus 43 and an internal data bus 44. The flash memory control section 5 is further connected to the first memory 4a via an internal control signal line 45 comprising a plurality of signal lines, to the second memory 4b via an internal control signal line 46 comprising a plurality of signal lines, to the third memory 4c via an internal control signal line 47 comprising a plurality of signal lines, and to the fourth memory 4d via an internal control signal line 48 comprising a plurality of signal lines.

The sequencer circuit section 6 is connected to the flash memory control section 5 via an internal address bus 49, an internal data bus 50, and an internal control signal line 51 comprising a plurality of signal lines. Also, the sequencer circuit section 6 is connected to the first buffer memory 7, the second buffer memory 8, the ECC circuit section 9 and the working buffer 10 via their corresponding internal address buses and an internal control signal line comprising a plurality of signal lines. Further, the sequencer circuit section 6 is connected to the interface circuit section 2 via an internal control signal line comprising a plurality of signal lines.

The interface circuit section 2 is equipped with registers (not shown) for temporarily storing address data and commands, which are inputted from the host system unit 20, and data, which is to be stored in the memory section 4, respectively. Also, the CPU 3 performs operation control of the sequencer circuit section 6 according to commands written into the interface circuit section 2 by the host system unit 20, and moreover decodes logical sector addresses written into the registers of the interface circuit section 2 and then outputs physical sector addresses of the memory section 4 to the flash memory control section 5.

The sequencer circuit section 6 performs operation control of the interface circuit section 2, the flash memory control section 5, the first buffer memory 7, the second buffer memory 8, the ECC circuit section 9 and the working buffer 10 according to commands from the CPU 3. The flash memory control section 5 performs operation control of each of the first memory 4a to the fourth memory 4d according to a command from the sequencer circuit section 6.

Each of the first buffer memory 7 and the second buffer memory 8 has enough storage capacity to store data of one erase block in the memory section 4 correspondingly, and according to a control signal from the sequencer circuit section 6, temporarily stores data, which is to be stored in the memory section 4, written in the registers within the interface circuit section 2 by the host system unit 20. Also, the ECC circuit section 9, according to a control signal from the sequencer circuit section 6, generates an ECC for the data stored in the first buffer memory 7 and the second buffer memory 8, and then stores the resulting ECC in the built-in RAM (not shown).

The CPU 3 instructs the sequencer circuit section 6 to perform operation control of the ECC circuit section 9, thereby reading the ECC generated by the ECC circuit section 9. After this, the CPU 3 instructs the sequencer circuit section 6 to perform operation control of the first buffer memory 7 and the second buffer memory 8, thereby writing the read ECC into the first buffer memory 7 or the second buffer memory 8, whichever it has stored data corresponding to the ECC.

Figure 2:
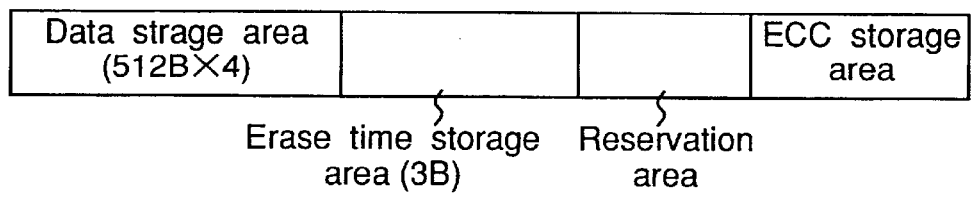
FIG. 2 is a view showing an arrangement example of the inside of an erase block in the memory section 4 of FIG. 1.

FIG. 2 is a view showing an arrangement example of the inside of an erase block in the memory section 4. As can be understood from FIG. 2, one erase block comprises a 2 Kbyte data storage area, a 3 byte erase-time storage area, a reservation area which is an empty area, and an ECC storage area for storing an ECC. The erase-time storage area, the reservation area and the ECC storage area are formed of, for example, 64 bytes.

Figures 3, 4:
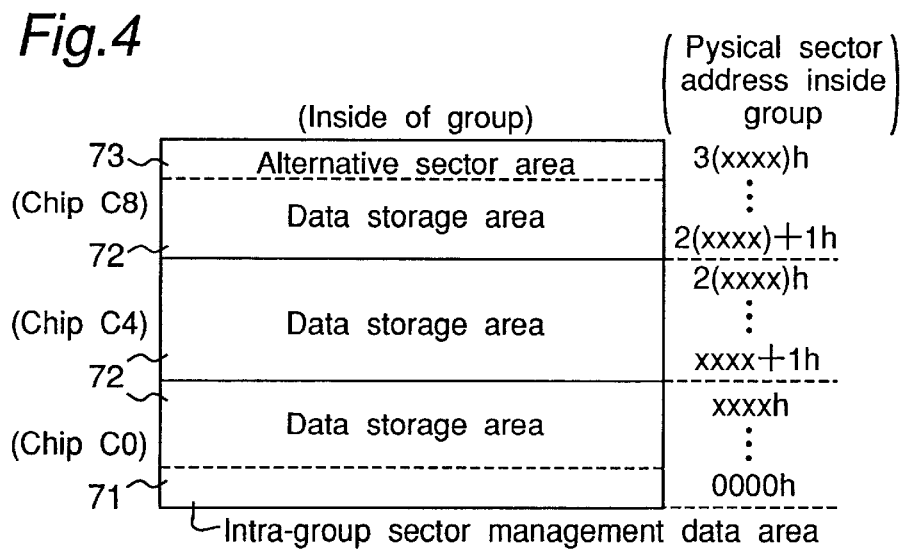
FIG. 3 is a view showing the relationship between logical sector addresses and physical sector addresses within the memory section 4 of FIG. 1.
FIG. 4 is a view showing the arrangement of the inside of the first memory 4a of FIG. 1.

FIG. 3 is a view showing the relationship between logical sector addresses and physical sector addresses within the memory 4. FIG. 4 is a view showing the arrangement of the inside of one group in the memory section 4, for example, the first memory 4a. FIGS. 3 and 4 show a case in which the memory section 4 comprises twelve memory chips C0 to C11 of the same storage capacity. In this case, the first memory 4a consists of memory chips C0, C4, C8, the second memory 4b consists of memory chips C1, C5, C9, the third memory 4c consists of memory chips C2, C6, C10, and the fourth memory 4d consists of memory chips C3, C7, C11. In addition, FIGS. 3 and 4 show only the data storage areas of erase blocks in the memory section 4.

In FIG. 3, data corresponding to four logical sector addresses can be stored within one physical sector address that forms one erase block. Logical sector addresses 0000000h to 0000003h correspond to a physical sector address 0000h of the memory chip C0, and the succeeding logical sector addresses 0000004h to 0000007h correspond not to the physical sector address 0001h of the memory chip C0 but to a physical sector address 0000h of the memory chip C1. Like this, when logical sector addresses specified by the host system unit 20 are consecutive, parallel processing can be carried on in the unit of first memory 4a to fourth memory 4d because data read or data write is done to memory chips of groups that differ every four sectors.

Also, as can be seen from FIG. 4, each group of the memory section 4 comprises an intra-group sector management data area 71, data storage areas 72 and an alternative sector area 73. The intra-group sector management data area 71 is an area to store therein a conversion table for translating data for management of intra-group sectors, i.e. logical sector addresses, into physical sector addresses. Also, the data storage areas 72 are areas for storing data from the host system unit 20, and the alternative sector area 73 is an area for saving data of any area which has become unusable when the intra-group sector management data area 71 or a data storage area 72 has become unusable for some reason.

The conversion table in the intra-group sector management data area 71 is arranged so as to be completed in each group, by which the CPU 3 is enabled to perform the processing independently for each group of the memory section 4. This makes it possible to perform data read and data write efficiently in burst data transfer.

Now the decoding of logical sector addresses specified by the host system unit 20 is explained. The CPU 3 converts logical sector addresses specified by the host system unit 20 into a physical sector address within the memory group shown in FIG. 4 by using the conversion tables stored in the intra-group sector management data areas 71 of the first memory 4a to the fourth memory 4d, respectively. The physical sector address inside the group is further converted into a physical sector address of a memory chip forming a memory group shown in FIG. 3 by the flash memory control section 5, while a chip enable signal that enables the memory chip is generated and outputted to the memory section 4.

In such a constitution, data write operation to the memory section 4 is explained.

FIG. 5 is a schematic time sequence showing the flow of write data inside the semiconductor storage device 1 during the data write operation. In addition, FIG. 5 shows a case where data is written successively in order into the first memory 4a to the fourth memory 4d.

Referring to FIG. 5, first, data to be stored in the first memory 4a is stored in the first buffer memory 7 from the host system unit 20 via the interface circuit section 2.

Next, data erase on an erase block in the first memory 4a corresponding to logical sector addresses inputted from the host system unit 20 is carried out. During the data erase of the erase block, data to be stored in the second memory 4b is stored in the second buffer memory 8 from the host system unit 20 via the interface circuit section 2, and then data erase on an erase block in the second memory 4b corresponding to logical sector addresses inputted from the host system unit 20 is carried out. Upon completion of the data erase on the erase block of the first memory 4a, the data stored in the first buffer memory 7 is transferred to the first memory 4a, where the first memory 4a performs data write.

Also, while data erase for the second memory 4b is in progress, the data transfer from the first buffer memory 7 to the first memory 4a is completed. Simultaneously with the completion of the data transfer, data to be stored in the third memory 4c is stored in the first buffer memory 7 from the host system unit 20 via the interface circuit section 2. After the data storage into the first buffer memory 7 is completed, data erase on an erase block in the third memory 4c corresponding to logical sector addresses inputted from the host system unit 20 is performed.

As the data erase for the second memory 4b is completed, data transfer from the host system unit 20 to the first buffer memory 7 is completed, and then data erase on an erase block in the third memory 4c corresponding to logical sector addresses inputted from the host system unit is carried out. While this data erase is in progress, data stored in the second buffer memory 8 is transferred to the second memory 4b, where the second memory 4b performs data write.

Also, simultaneously when the transfer of data stored in the second buffer memory 8 to the second memory 4b is completed, data to be stored in the fourth memory 4d is stored in the second buffer memory 8 from the host system unit 20 via the interface circuit section 2. After the data storage into the second buffer memory 8 is completed, data erase on an erase block in the fourth memory 4d corresponding to logical sector addresses inputted from the host system unit 20 is performed.

With the data erase on the erase block in the third memory 4c completed, while the data erase on the erase block in the fourth memory 4d is in progress, the data stored in the first buffer memory 7 is transferred to the third memory 4c, where the third memory 4c performs data write. Also, upon completion of data erase on the erase block in the fourth memory 4d, the data stored in the second buffer memory 8 is transferred to the fourth memory 4d, where the fourth memory 4d performs data write.

Like this, since the first buffer memory 7 and the second buffer memory 8 do not correspond to the first memory 4a to the fourth memory 4d of the memory section 4, simultaneously with the completion of the transfer of data in each buffer memory, the next data from the host system unit 20 can be stored.

Next, the data write operation in the semiconductor storage device 1 is described in more detail, taking as an example a case where data is written into the first memory 4a.

The host system unit 20 outputs to the address bus 21 address data showing a register within the interface circuit section 2 where a command showing a data write request is to be stored, outputs to the control signal line 23 various control signals such as a write enable signal for causing data write operation to be performed, and outputs the command to the data bus 22. In a similar manner, the host system unit 20 writes parameters, such as logical sector addresses where data is to be stored and the number of transfer sectors, into the registers within the interface circuit section 2.

The CPU 3 instructs the sequencer circuit section 6 to output various control signals to the interface circuit section 2 so that the command is read from the register within the interface circuit section 2, and moreover outputs to the internal address bus 31 the address data showing the register in which the command has been stored. In this way, the read command is inputted to the CPU 3 via the internal data bus 32.

The CPU 3 outputs to the internal address bus 34 the address data showing the register within the sequencer circuit section 6 according to the acquired command, outputs to the control signal line 36 various control signals such as the write enable signal for causing the data write operation to be performed, and outputs to the internal data bus 35 a command for instructing data transfer between the host system unit 20 and the first buffer memory 7. Thus, the command is stored in the register within the sequencer circuit section 6.

The sequencer circuit section 6 outputs to the first buffer memory 7 the address data showing the first buffer memory 7 as well as various control signals such as the write enable signal for causing the data write operation to be performed, and data outputted from the host system unit 20 to the data bus 22 is transferred to the first buffer memory 7 via a data register (not shown) within the interface circuit section 2 and the internal data bus 33.

Next, the CPU 3 reads the logical sector addresses stored in the register within the interface circuit section 2, in the same manner as the command was read, and based on the read logical sector addresses, reads the conversion table from the intra-group sector management data area 71 stored in a memory group of the memory section 4, for example, the first memory 4*a*, and then stores the conversion table in the working buffer 10.

More specifically, the CPU 3 outputs to the internal address bus 34 address data showing a register (not shown) within the sequencer circuit section 6, and outputs to the internal control signal line 36 various control signals such as a write enable signal for causing the register to perform data write operation. Simultaneously, the CPU 3 outputs to the internal data bus 35 a command for causing the sequencer circuit section 6 to perform data write operation to a register within the flash memory control section 5.

The sequencer circuit section 6 outputs to the internal address bus 49 address data showing a register within the flash memory control section 5 according to the command written into the built-in register, and moreover outputs to the internal control signal line 51 various control signals such as a write enable signal for causing the register to perform data write operation. Then, the data of a physical sector address outputted from the CPU 3 to the internal data bus 37 is stored in one register within the flash memory control section 5.

Subsequently, the sequencer circuit section 6 outputs to the internal address bus 49 address data showing another register (not shown) within the flash memory control section 5, and moreover outputs to the internal control signal line 51 various control signals such as a write enable signal for causing the register to perform data write operation. Simultaneously, the sequencer circuit section 6 outputs to the internal data bus 50 a command for causing the flash memory control section 5 to perform data read operation from the memory section 4, thereby making the command stored in another register within the flash memory control section 5.

According to the command from the sequencer circuit section 6, the flash memory control section 5 decodes the physical sector address data stored from the CPU 3, and outputs to the internal control signal line 45 a chip enable signal so that the memory chip C0 of a memory group in the memory section 4, for example, the first memory 4*a* is enabled. Simultaneously, the flash memory control section 5 outputs to the internal address bus 43 physical sector address data targeted for data read, and outputs to the internal data bus 44 a command for causing the IC memory having the memory chip C0 to perform data read operation.

Subsequently, the sequencer circuit section 6 outputs to the working buffer 10 address data showing the working buffer 10 as well as various control signals such as a write enable signal for causing data write operation to be performed, and the conversion table read from the memory section 4 is stored in the working buffer 10. Further, the CPU 3 sets a command to instruct the sequencer circuit section 6 to read the conversion table stored in the working buffer 10.

According to the set command, the sequencer circuit section 6 outputs to the working buffer 10 the address data showing the working buffer 10 as well as various control signals such as the write enable signal for causing the data read operation to be performed. In this way, the conversion table stored in the working buffer 10 is transferred to the CPU 3 via the internal data bus 41. In a similar manner, the conversion tables stored in the intra-group sector management data areas 71 of the second memory 4*b* to the fourth memory 4*d* are transferred to the CPU 3 via the working buffer 10.

The CPU 3, after acquiring the physical sector address data within the memory groups corresponding respectively to the logical sector addresses specified by the host system unit 20 with the use of the acquired conversion tables, sets the physical sector address data to the flash memory control section 5 by using the sequencer circuit section 6 in the same way as described above, and moreover instructs the flash memory control section 5 to perform data erase on the data storage area of the memory section 4 designated by the set physical sector address data.

While the memory section 4 is performing the data erase, the CPU 3 sets a command to the sequencer circuit section 6 for causing the data stored in the first buffer memory 7 to be transferred to the ECC circuit section 9, and the sequencer circuit section 6 transfers the data stored in the first buffer memory 7 to the ECC circuit section 9 via the internal data bus 42. The ECC circuit section 9 generates an ECC with respect to the transferred data and stores the ECC in the built-in RAM. The CPU 3 instructs the sequencer circuit section 6 to transfer the ECC stored in the RAM to the CPU 3 via the internal data bus 40, and further causes the ECC transferred to the CPU 3 to be stored in the first buffer memory 7 via the internal data bus 38.

Also, while the memory section 4 is performing data erase, the next data from the host system unit 20 is stored in the second buffer memory 8 via the data bus 22, the interface circuit section 2 and the internal data bus 33, in the same way as the data from the host system unit 20 was stored in the first buffer memory 7. In addition, data write operations to the second memory 4*b*, the third memory 4*c* and the fourth memory 4*d* are similar to the foregoing, and their description is omitted.

Upon completion of the data erase by the memory section 4, the CPU 3 sets to the sequencer circuit section 6 a command for causing the data attached with the ECC stored in the first buffer memory 7 to be transferred to the memory section 4 via the internal data bus 44. The sequencer circuit section 6 controls the flash memory control section 5 and the first buffer memory 7 so that the data of the first buffer memory 7 is transferred to the memory section 4 according to the command. In this way, the data stored in the first buffer memory 7 is stored at the physical sector address of the memory chip corresponding to the physical sector address within the memory group set to the flash memory control section 5.

In this embodiment, two buffer memories are provided against four memory groups of the memory section 4. However, the present invention not being limited to this, it is acceptable to provide buffer memories that count half the number of memory groups in the memory section 4.

As shown above, in the semiconductor storage device of this embodiment, the memory chips constituting the memory section 4 are used in divisions of the first memory 4a to the fourth memory 4d, which are memory groups counting double the number of the two buffer memories capable of storing the data of a unit erase block, the first buffer memory 7 and the second buffer memory 8, and moreover consecutive logical sector addresses are assigned to memory groups that differ from erase block to erase block. As a result of this, high-speed data write and data read operations are enabled, and particularly in burst data transfer, data write and data read operations can be efficiently accomplished. Moreover, the number of buffer memories can be reduced, allowing cost reduction to be realized.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A semiconductor storage device which is to be used in connection with a host system unit and which is implemented by block-erase type nonvolatile memory, the semiconductor storage device comprising:

a memory section comprising a plurality of integrated circuit memories of block-erase type nonvolatile memory each integrated circuit memory comprised of a plurality of erase blocks each erase block having a plurality of sectors;

a buffer memory section comprising a plurality of buffer memories for temporarily storing therein data which is transferred from the host system unit to be stored in the memory section;

a control section for performing operation control of the memory section and the buffer memory section according to a command from the host system unit, wherein the control section controls the memory section by grouping said plurality of integrated circuit memories into a plurality of memory groups and assigning respective sequences of logical sector addresses to each memory group such that the logical sector addresses in one erase block of each memory group are sequenced in series to the logical sector addresses in the corresponding erase block of the next succeeding memory group.

2. The semiconductor storage device according to claim 1, wherein the number of memory groups is equal to twice the number of the buffer memories in the buffer memory section.

3. The semiconductor storage device according to claim 1, wherein each memory group stores each address conversion table for converting logical sector addresses into physical sector addresses one to one in a specified memory space of each memory group.

4. The semiconductor storage device according to claim 1, wherein each buffer memory in the buffer memory section has enough storage capacity to store at least data of one erase block of the integrated circuit memory.

* * * * *